(12) United States Patent
Watanabe et al.

(10) Patent No.: US 6,775,230 B1
(45) Date of Patent: Aug. 10, 2004

(54) APPARATUS AND METHOD FOR TRANSMITTING FRAMES VIA A SWITCH IN A STORAGE AREA NETWORK

(75) Inventors: Naoki Watanabe, Sunnyvale, CA (US); Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 771 days.

(21) Appl. No.: 09/618,318

(22) Filed: Jul. 18, 2000

(51) Int. Cl.[7] .................................. H04L 12/26
(52) U.S. Cl. ................. 370/228; 370/218; 709/239; 714/4
(58) Field of Search ................... 370/216, 217, 370/218, 225, 228; 709/250, 238, 239; 714/1–4, 43

(56) References Cited

U.S. PATENT DOCUMENTS

| | | | | |
|---|---|---|---|---|
| 5,835,696 A | * | 11/1998 | Hess | 714/10 |
| 5,848,227 A | * | 12/1998 | Sheu | 714/4 |
| 6,128,750 A | * | 10/2000 | Espy et al. | 714/7 |
| 6,260,158 B1 | * | 7/2001 | Purcell et al. | 714/10 |
| 6,343,324 B1 | * | 1/2002 | Hubis et al. | 709/229 |
| 6,400,681 B1 | * | 6/2002 | Bertin et al. | 370/218 |
| 6,571,355 B1 | * | 5/2003 | Linnell | 714/9 |
| 6,625,747 B1 | * | 9/2003 | Tawil et al. | 714/6 |
| 6,687,758 B2 | * | 2/2004 | Craft et al. | 709/250 |
| 2003/0140124 A1 | * | 7/2003 | Burns | 709/220 |

* cited by examiner

Primary Examiner—Seema S. Rao
Assistant Examiner—Robert C Scheibel
(74) Attorney, Agent, or Firm—Townsend and Townsend and Crew LLP

(57) ABSTRACT

A method and apparatus is provided to determine a path from a plurality of predetermined paths between a server system and a storage system in a Storage Area Network by a Fiber Channel Fabric, including one or more Fiber Channel switches. One embodiment, provides a method for selecting a path from a plurality of pre-determined paths between a computer system and a storage system in a Storage Area Network, where the computer system and the storage system are connected together by one or more Fiber Channel switches. The method includes, establishing a first path from the plurality of pre-determined paths between the computer system and the storage system. Next, a status of the first path is determined by the Fiber Channel switch or switches; and a second path from the plurality of predetermined paths is selected based on the status of the first path. The selection by the Fiber Channel switch is independent of the computer system. The status could be, for example, a first path failure, such as a loss of reliable communications on a link of the first path, or a first path usage above a threshold.

11 Claims, 5 Drawing Sheets

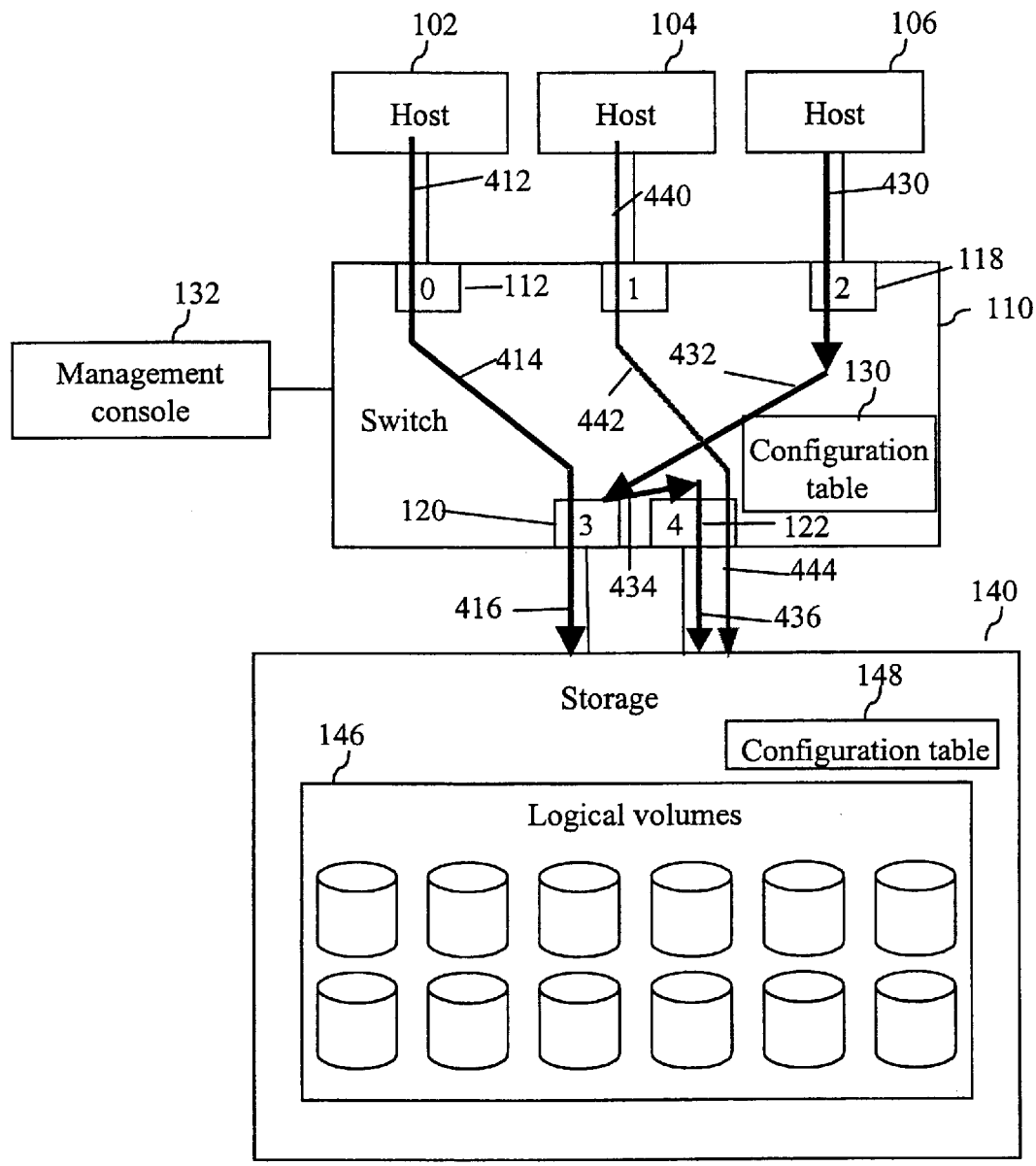

APPARATUS AND METHOD FOR TRANSMITTING FRAMES VIA A SWITCH IN A STORAGE AREA NETWORK

CROSS-REFERENCES TO RELATED APPLICATIONS

The three following proposed standards of the American National Standards Institute (ANSI) are hereby incorporated by reference.

"Fibre Channel Switch Fabric (FC-SW)," rev 3.3, NCITS working draft proposed, American National Standard for Information Technology, Oct. 21, 1997;

"Fibre Channel Physical And Signaling Interface (FC-PH)," rev 4.3 X3 working draft proposed, American National Standard for Information Systems, June 1, 1994; and "SCSI Fibre Channel Protocol—Second Revision (FCP-2)," NCITS proposed draft, Dec. 21, 1999.

BACKGROUND OF THE INVENTION

This invention relates to a method and apparatus for path determination in a storage area network (SAN). More particular this invention relates to selecting a path of a plurality of paths by a switch or switches connecting a host system to a storage system.

In the 1970's and 1980's various methods were developed for sharing storage between multiple computer servers, i.e., hosts. One such system was developed by U.S. Pat. No. 4,455,605, Cormier et al, filed Jul. 23, 1981 (herein referenced as Cormier). Cormier describes a path group having a plurality of communication paths between a host and the storage system. The communication paths were connection oriented and unless, the data traffic was continuous, there were numerous disconnections and reconnections to maintain good path utilization. In addition the selection of the path group was done by the host. While the redundancy in paths between the host and the storage system increases reliability, problems occurred in a heterogeneous operating system environment, for example, Windows, Mac, UNIX. Each host with its associated operating system would require a different implementation to determine the path group for that host's operating system.

In the 1990's performance improvements in storage and processors along with the move to distributed architectures such as client/server led to data intensive and high-speed network applications. This led to the development of storage area networks (SAN's) which connected one or more servers to one or more storage systems via a Fibre Channel Fabric having one or more switches. The protocol is described in ANSI drafts FC-HW and FC-SW which are incorporated by reference. The Fiber Channel Protocol includes both copper and optical cable with speeds up to a few gigabits per second. While Fiber Channel has point to point service (Class 1), of primary use for SAN's is connectionless service (Classes 2 and 3). Connectionless service uses frames, like for example, network packets, which allow a high data transfer rate.

FIG. 1 shows an example of a Storage Area Network. The Fibre Channel Fabric 12 includes one or more Fibre Channel switches 14, for example, "Silkworm" switches from Brocade Communications Systems, Inc., or "SANbox" switches from Ancor Communications, Inc The fabric connects one or more computer server systems 20, 22 with one or more storage systems 30, 32, 34. Each storage system could be, for example, a Redundant Array of Independent Disks (RAID), Direct Access Storage Device (DASD), tape backup, a CD-ROM library, or JBOD (Just a Bunch of Disks).

Fibre Channel switches such as from Brocade and Ancor provide fault tolerance due to switch failure as well as auto-discovery of end nodes, for example storage systems and hosts. If multiple switches are configured as a mesh or Ancor's Multistage™ Cross-connect, then the fabric should function at normal or near normal capacity with a switch failure. However, this addresses a small subset of path failures between source, e.g., server 20, and destination, e.g., RAID 30, systems. An example failure would be a port failure due to loss of reliable communications on a link from that port. In addition the change in path for frames due to load balancing is not addressed.

Thus there is a need for a more comprehensive, but simple, technique to change a path due to path failure or to provide for better path utilization, for example, by load balancing.

SUMMARY OF THE INVENTION

The present invention relates generally to a Fibre Channel Fabric determining an alternative path from a plurality of predetermined paths between a server system and a storage system in a Storage Area Network, where the Fibre Channel Fabric, includes one or more Fibre Channel switches.

An exemplary embodiment, provides a method for selecting a path from a plurality of pre-determined paths between a computer system and a storage system in a Storage Area Network, wherein the computer system and the storage system are connected together by one or more Fibre Channel switches. The method includes, establishing a first path from the plurality of predetermined paths between the computer system and the storage system. Next, a status of the first path is determined by the Fibre Channel switch or switches; and a second path from the plurality of pre-determined paths is selected based on the status of the first path. The selection by the Fibre Channel switch is independent of the computer system. The status could be, for example, a first path failure, such as a loss of reliable communications on a link of the first path, or a first path usage above a threshold.

In a second embodiment of the present invention a system for selecting an alternate path from a path group having a plurality of Fibre Channel paths in a Storage Area Network is provided. The system includes, a host, having a processor and a memory; a switch, including a processor and a memory, coupled to the host by a Fibre Channel path. The switch memory stores a data structure having the path group for determining the alternate path; and a storage system, including at least one logical volume, coupled to the switch by at least two Fibre Channel paths. In addition the switch may select the alternate path when an established path between the switch and storage system fails or when an established path between the switch and storage system has a usage above a pre-determined threshold.

In another embodiment of the present invention a Fibre Channel network device for connecting a host computer system to a storage system is provided. The network device includes: a plurality of ports belonging to a path group, where a first port in the path group receives the information designated for a second port in the path group, when there is a status change in the first port; a processor; and a memory having software operated on by the processor, the software including a table having the plurality of ports and the path group. The change in status may be, for example, a high usage of the first port or a first port failure.

BRIEF DESCRIPTION OF THE DRAWINGS

FIG. 5 shows an example of the load balancing process of a specific embodiment of the present invention.

DESCRIPTION OF THE SPECIFIC EMBODIMENTS

In a specific embodiment of the present invention a method and system is provided that selects a path in a path group at a switch independent of the host, for example, servers 20 and 22. Thus in a heterogenous operating system environment, the selection of paths is transparent to the hosts. The path group is a set of alternate paths between a server, for example, server 20, and a storage system, for example shared storage 34. The path groups for a switch are pre-determined from a storage configuration of the storage device either manually by a systems administrator or automatically by a Fibre Channel switch (or switches) after auto discovery recognizes the devices connected to the switch's ports. The switch has a configuration table, which includes information on the paths such as status, usage of the path, and the path group. When a path failure occurs, the switch can reroute the frame(s) to an alternative path in the path group by searching the configuration table. If there is no alternative path, the switch indicates an error that it cannot transfer the frame(s). In this embodiment load balancing may be done within a path group, by using another path in the path group, when the path usage becomes high, i.e., above a threshold. If there is no alternative path in the path group, then the switch continues to use the high usage path.

Figure 1:
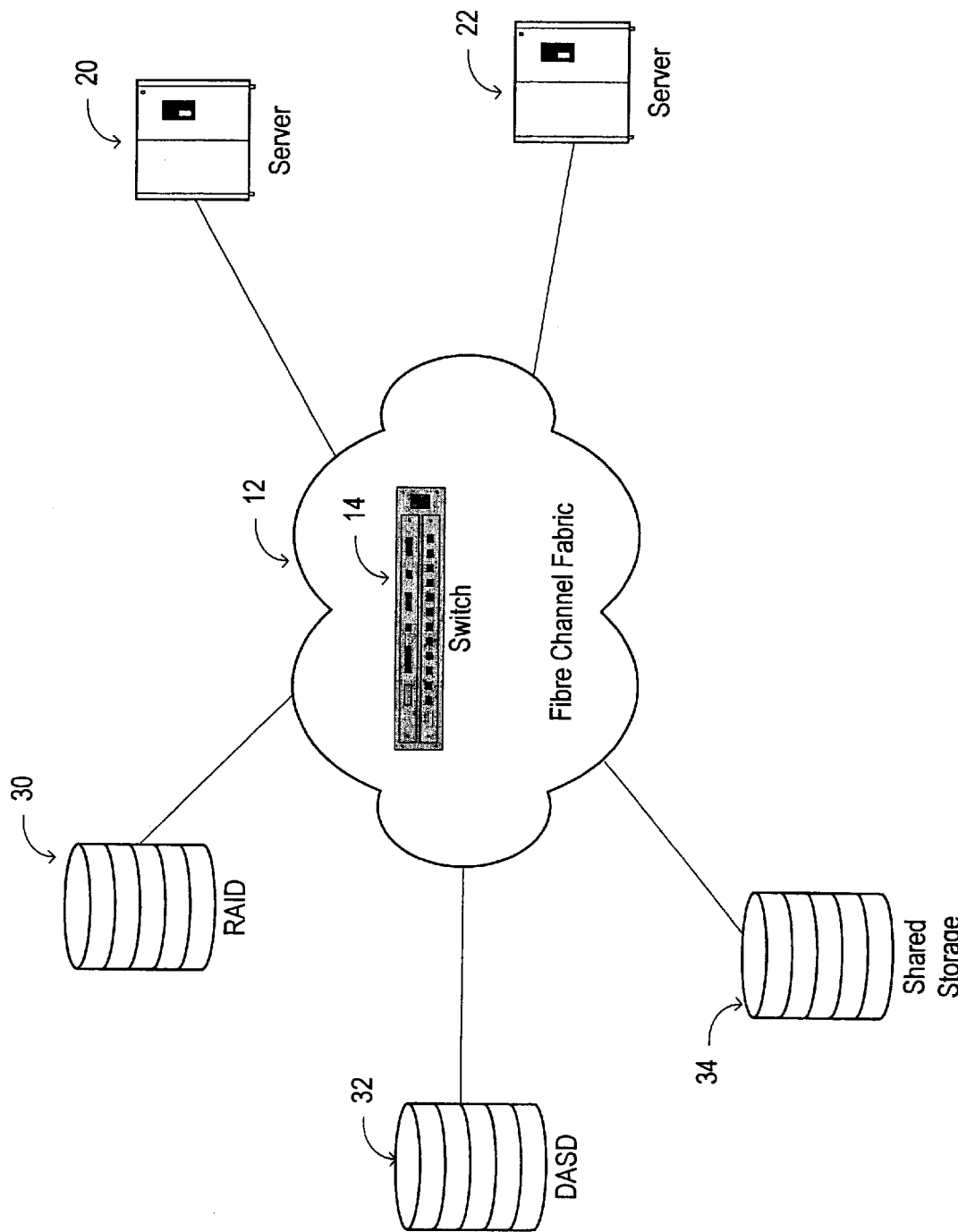
FIG. 1 shows an example of a Storage Area Network (Prior Art)
Figure 2:
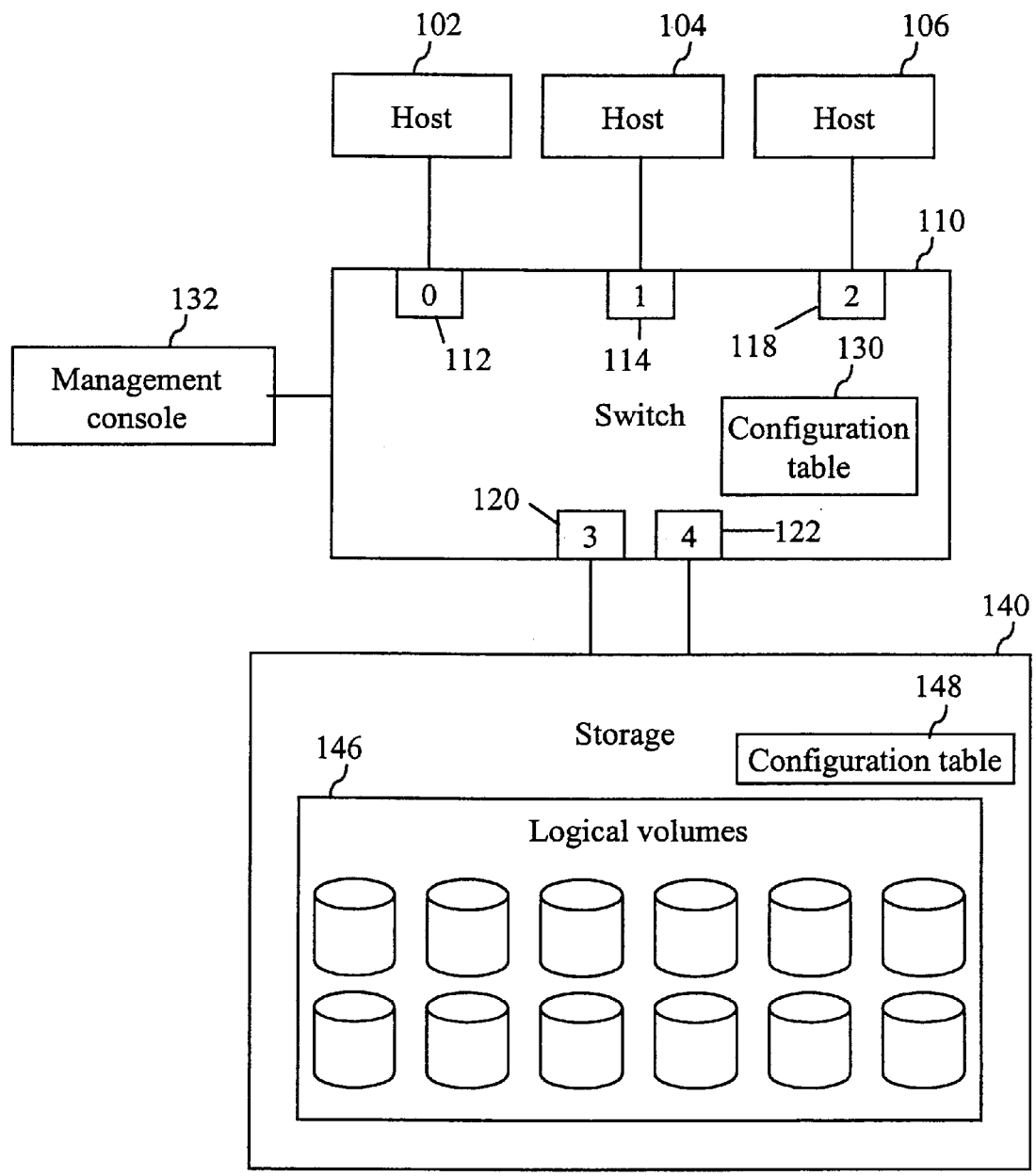
FIG. 2 shows an example storage area network of an embodiment of the present invention.

FIG. 2 shows an example storage area network of an embodiment of the present invention. There are three hosts 102, 104, 106, i.e., computer systems, connected to a switch 110 through ports 112, 114, and 118 respectively. The switch 110 includes a switch configuration table 130, and the switch 110 is connected to a management console 132, which is used for defining settings of the switch and for path management. The management console may be like those provided by Brocade Communications Systems, Inc., or Ancor Communications, Inc. for their Fibre Channel switches. There are two ports 120 and 122 which connect the switch 110 to the storage system 140. The storage system 140 includes a storage configuration table 148 and one or more logical volumes 146. The logical volumes 146 are logical mappings of storage across one or more, for example, physical hard disks.

Each host 102, 104, and 106 has at least one Fibre channel path. The hosts may have different Operating System (for example, MVS, Unix, Windows, or the like), and they communicate through the switch 110 (or fabric 12) to the logical volumes 146 by using the Small Computer Systems Interface (SCSI) Fibre Channel Protocol (FCP). For example, a host 102, sends a frame, to the storage system 140 through a Fibre channel path which includes switch ports 112 and 120. The frame includes a destination address of the frame: D_ID, which is described in FC-PH. In this example the D_ID of the frame would be port 3 (120).

In a specific embodiment the switch 110 upon receiving the frame from the host 102 examines both its routing table to determine the output port and the switch configuration table 130 to determine information on the output port such as status and usage. Table 1 below shows an example of a configuration table 130:

TABLE 1

Switch Configuration Table

| Port | Status | Usage | Alt. Port | WWN | Path Group |
|---|---|---|---|---|---|
| 0 | Good | 10% | — | N1 | G |
| 1 | Good | 25% | — | N2 | F |
| 2 | Good | 20% | — | N3 | E |
| 3 | Fail | 0% | 4 | N4 | A |
| 4 | Good | 5% | 3 | N5 | A |
| ... | | | | | |
| m-1 | Good | 8% | — | N(m-1) | I |

The information in Table 1 includes the path's port ID (described in FC-SW, FC-PH), the World Wide Name (WWN or worldwide unique address, described in FC-PH), the path group, alternate port (Alt. port, which represents an alternate path in the path group), and port status (for example: good, or failed). While Table 1 shows the case of "m" ports on a Fibre Channel switch, where "m" is an integer, in the example of FIG. 2, each host 102, 104, 106, has one Fibre channel path numbered as a port ID 0, 1, 2, (112, 114, 118) and the storage system 140 has two Fibre channel paths numbered as a port ID 3 and 4 (120, 122). Both port ID's 3 and 4 belong to the same path Group A. This means that each is an alternate path for the other as indicated by the Alt. Port table entries for ports 3 and 4. In another embodiment there may be several alternate paths and the Alt. Port column in Table 1 may have a set of alternate paths for each port; each set having zero (null set) or one or more alternative ports.

In the above example the frame may proceed through port ID 4 to storage 140. The storage has at least two Fibre channel paths 120, 122. The Fibre channel path, e.g., port ID 4, is used for sending read/write commands. The storage 140 can accept these FCP commands and respond with data transfer. In one embodiment a system administrator defines the logical volume to port ID, i.e., storage path, mapping. The system administrator may also set the path groups at the storage 140. Table 2 shows an example of a storage configuration table 148:

TABLE 2

Storage Configuration Table

| | | | Logical Volumes | | |
| Port | Status | Path Group | 0 | 1 | ... | n-1 |
|---|---|---|---|---|---|---|
| 3 | Fail | A | X | — | | — |
| 4 | Good | A | X | — | | — |
| ... | | | | | | |
| k-1 | Good | B | — | X | | — |

Table 2 shows the ports the storage system 140 is mapped to. There may be other switches as indicated by the k-1 row, where "k" is an integer. In the example of FIG. 2, there are only ports 3 and 4. The next column indicates the status of the ports (e.g., good, fail). The path group typically is set at the storage system 140 first and then sent to the switch 110. There are "n" logical volumes 146 ("n" is an integer), which represents the logical storage partitioning in the storage system 140. Unless assigned to a path group, each path has its own logical volume number. If a host attempts to access the logical volume through a path which does not have access to the volume or an alternative path, then the storage system 140 sends an error message to that host. The system administrator also defines the path groups; each path group permits access via any path within that path group. For example host 102 gets an error indication from storage system 140, if the host attempts to access logical volume 1 through port 4 122. If the paths are in the same path group, such as path group "A" for ports 3 and 4 in Table 2, then the access is to the same logical volume, in this case logical volume 0 in Table 2. Thus the storage system 140 can receive the frame within same path group, for ports without changing frame contents like destination ID (D_ID).

In one embodiment of the present invention the path groups are pre-determined. A system administrator first sets a storage volume configuration by defining the logical volumes, their relationship to the physical storage and then mapping the ports to the logical volumes, for example, Table 2 above. Next the path groups are set with the major purpose of reliability and performance (throughput), for example ports 3 and 4 in Table 2. The path groups are then sent to the switch 110 to set the switch configuration table, e.g., Table 1. In another embodiment after the system administrator sets the logical volumes and path groups at the storage, the switch may automatically retrieve the path group information using a switch vendor's FCP commands.

Figure 3:
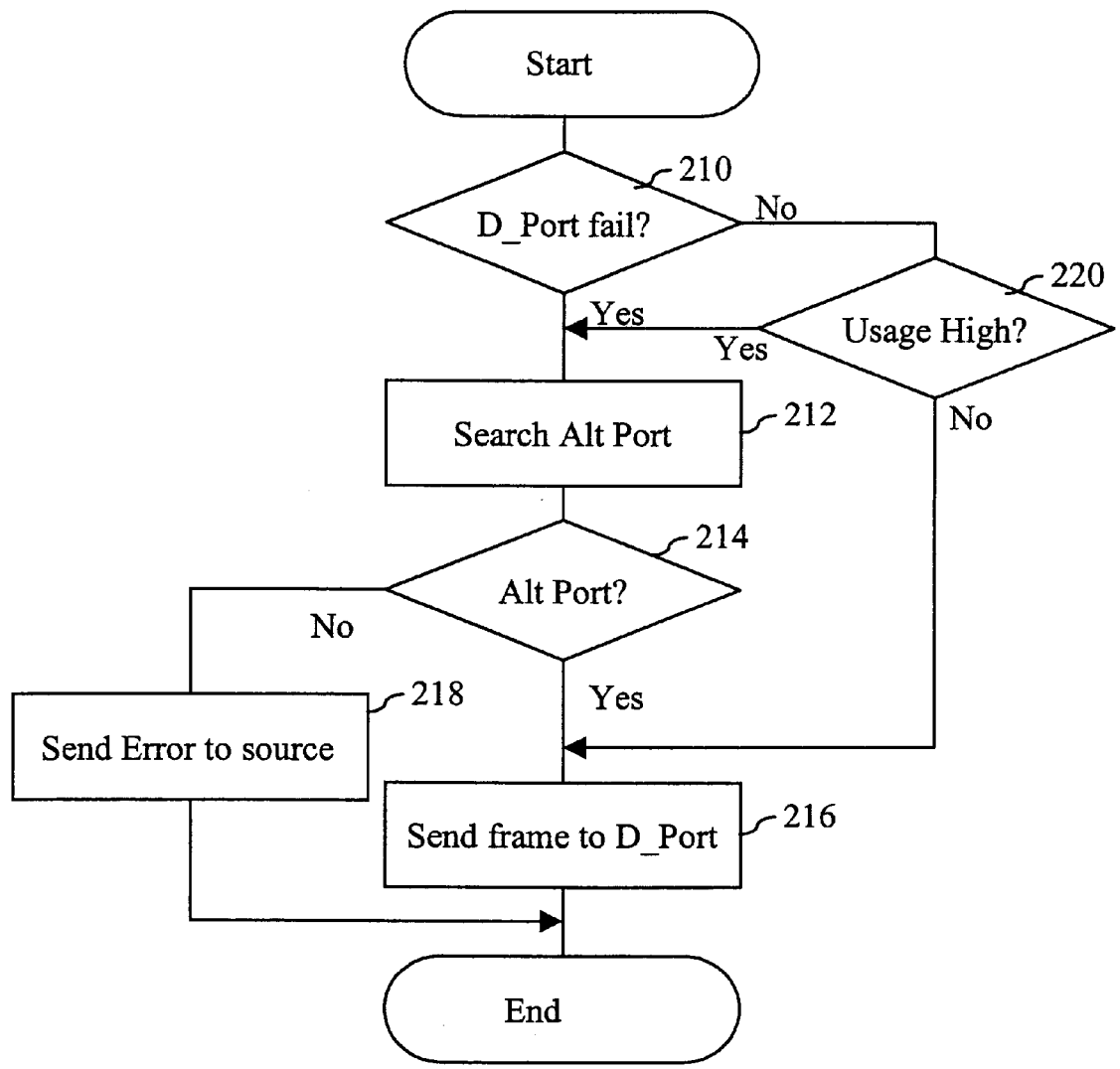
FIG. 3 illustrates a flowchart of the switching process of one embodiment of the present invention.

FIG. 3 illustrates a flowchart of the switching process of one embodiment of the present invention. The flowchart starts after the switch 110 receives a frame from the host, for example, host 102. The switch examines the destination id (D_ID) of the frame and then checks the destination port (DEPort) the D_ID refers to. If the D_Port fails (Step 210), for example, the port does not have reliable communications with the storage system 140, then the switch proceeds to step 212. If the port is good, then the switch proceeds to step 220 (usage check). At step 212, the configuration table 130, e.g., Table 1, is examined for alternate paths. The path should be within the same group, have good status, and a low usage. At step 214 if the switch can find an alternate port, then the switch proceeds to Step 216 (Send frame). If the switch cannot find an alternate port, then the switch sends an error status to the source, i.e., host (step 218). At step 216 the switch sends the frame to the alternative port (Alt. port), and the frame is received by the storage system 140. At step 220 the switch checks the D_ID port usage. If the port is usage is high, i.e., above a predetermined threshold, the switch proceeds to step 212. If the port usage is low, i.e., equal or less than the threshold, the switch proceeds to step 216 (Send frame). The threshold, may be fixed by the system administrator. The switch monitors each port usage, and periodically updates usage of each port.

In a specific embodiment there are two specific situations in which an alternate path from a path group may be selected, thus changing the path a frame travels from the host through the switch to the storage system: Fail-over and load balancing.

Figure 4:
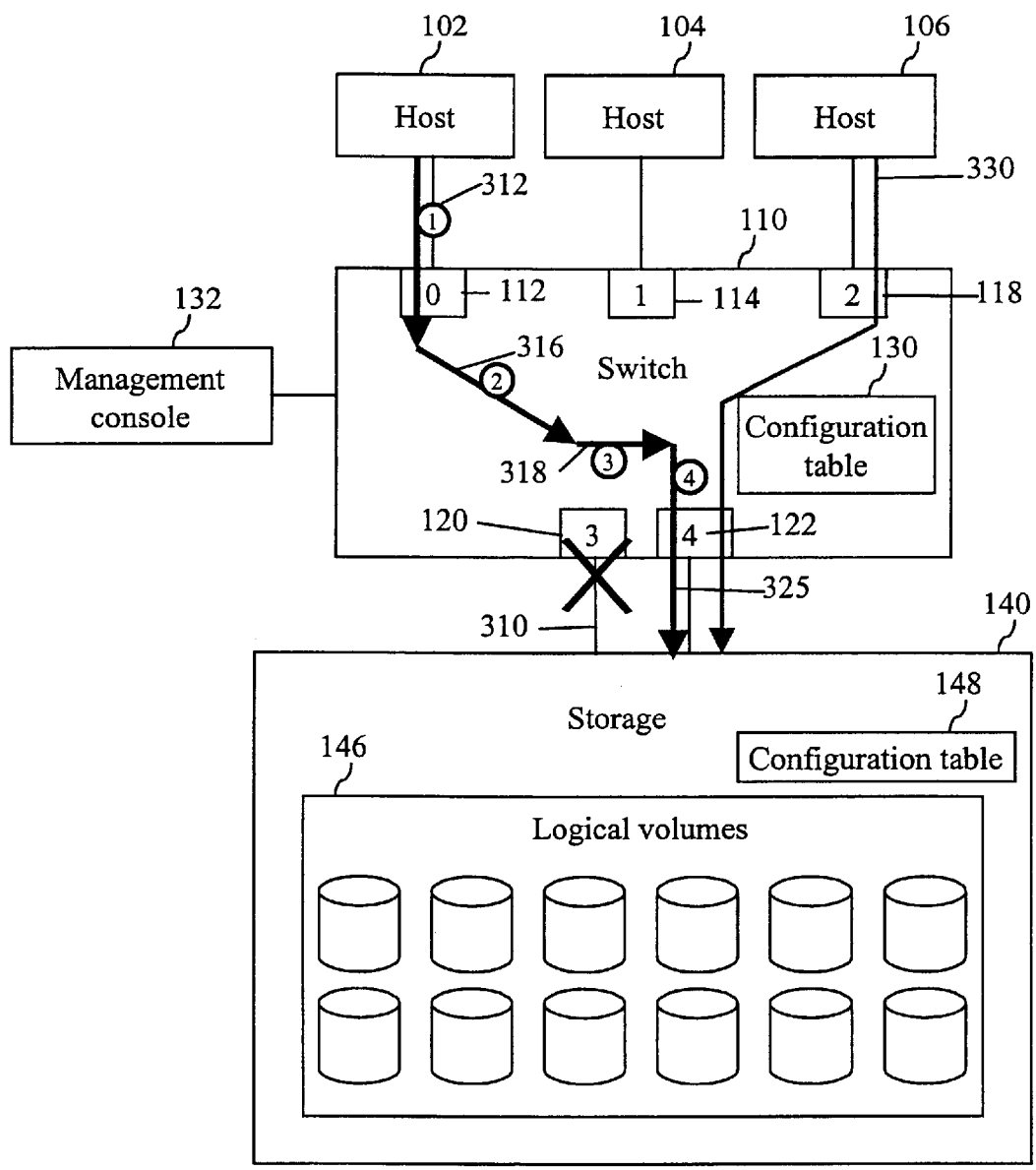
FIG. 4 shows an example of the fail-over process of a specific embodiment of the present invention.

FIG. 4 shows an example of the fail-over process of a specific embodiment of the present invention. To achieve better system reliability a path group policy is used. This example is the case of a path failure 310 related to port 3 120. First host 102 sends a Fibre channel frame to port ID 3, i.e., D_ID is port 3. Next the switch receives the frame at port ID 0 112. The switch checks D_ID port 3 in the switch configuration table 130, e.g., Table 1. In this case port No. 3 status is fail, so the switch seeks an alternative path, which has good status and is in the same path group as port 3. In this example, the path group is "A," and the alternative path from Table 1 is port 4. The switch then sends the frame to the storage system 140 via port 4. Thus the path has been altered from 312, 316, & 310 to 312, 316, 318, & 325.

When the storage system 140 receives the frame, the storage system checks it. For this example, the port ID in which the frame was received, i.e., port 4, is not the same as the D_ID, i.e., port 3. However, the D_ID, is within the same path group, i.e., group A, as the received port ID as seen in Table 2. Thus port 4 can receive port 3's frame. The storage system responds as if alternative port is same as the failed port.

FIG. 5 shows an example of the load balancing process of a specific embodiment of the present invention. To improve performance, i.e., better throughput, a path group policy is used. This example uses Table 3 below which shows another switch configuration table. The starting paths for frames from host 102 are 412 to port 0 112, 414 to port 3 120, and 416 from port 3 120 to storage system 140. Frames from host 106 go via 430 to port 2 118, via 432 to port 3 120, and via 416 from port 3 120 to storage system 140. In one embodiment the frames from host 102 and host 106 are time multiplexed on path 416. Frames from host 104 take paths 440, 442, and 444 in getting to storage system 140. Table 3 shows for a first period of time, the port 4 usage to be low, about 5%, but port 4 usage to be high at about 40%.

TABLE 3

Switch Configuration Table

| Port | Status | Usage | Alt. Port | WWN | Group |
|---|---|---|---|---|---|
| 0 | Good | 25% | — | N1 | G |
| 1 | Good | 5% | — | N2 | F |
| 2 | Good | 15% | — | N3 | E |
| 3 | Good | 40% | 4 | N4 | A |
| 4 | Good | 5% | 3 | N5 | A |

In this embodiment host 106 in a next period of time sends a frame to D_ID port 3. The switch 110 receives the frame at port 2 106. Next the switch checks the switch configuration table 130, e.g., Table 3. In this case port 3 120 has a high usage, e.g., 40%, and the switch seeks to alter the path to an alternative port which has good status and the same path group, e.g., "A." In this example the alternative path is port 4 122. The switch then sends the frame to the storage system 140 via port 4 122. When the storage system 140 receives the frame, the frame D_ID is not same as switch port 4. However, the frame D_ID is within the same path group as port 4, as seen in Table 2, and the storage system responds as it received the frame from port 3. This means the storage port 4 can receive port 3's frame. Thus the paths for the frame(s) from host 106 have been altered from 430, 432, & 416 to 430, 432, & 436. In this example in Table 3 the load usage on port 3 may drop to about 25% and the load on port 4 increases to about 20%. The loads between ports to the storage are now more evenly balanced. In another embodiment, before the switch alters the path of frames from host 106 from port 3 to port 4, the switch checks the usage of port. If the usage is high (above a pre-determined threshold), then no change of path is allowed, and host 106 send its frames to port 3, not port 4. If the usage is low, as in the example of Table 3, then a change from port 3 to port 4 occurs.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for transmitting frames between a computer system and a storage system in a Storage Area Network, wherein the computer system and the storage system are coupled together by a switch, wherein at least a first port with a first port ID of the switch is coupled to the computer system, wherein a plurality of ports of the switch are coupled to the storage system, the method comprising:

mapping a logical volume presented by the storage subsystem to at least a second port with a second port ID and a third port with a third port ID of the ports, wherein the logical volume is accessed by the computer system;

establishing, at the switch, a first path between the first port and the second port and a second path between the first port and the third port;

selecting the first path to send a frame from the computer system;

receiving, at the switch, a first frame including the second port ID from the computer system;

sending the first frame including the second port ID to the storage system via the first path;

receiving, at the storage system, the first frame including the second port ID from the second port;

determining a status of the first path by the switch; and switching from the first path to the second path based on the status;

receiving, at the switch, a second frame including the second port ID from the computer system;

sending the second frame including the second port ID to the storage system via the second path;

accepting, at the storage system, the second frame including the second port ID received from the third port.

2. The method of claim 1 wherein the status comprises a first path failure.

3. The method of claim 2 wherein the first path failure comprises a loss of reliable communications on a on a link of the first path.

4. The method of claim 1 wherein the status comprises a first path usage above a threshold.

5. The method of claim 1 wherein the switch is a Fibre Channel switch.

6. The method of claim 1 wherein the first path and the second path belong to a same path group.

7. A method for transmitting frames from a computer system to a storage system via a switch provided in a network, the switch having at least first, second and third ports, the method comprising:

mapping a logical volume defined in the storage subsystem to at least the first port having first port identification information and a second port having second port identification information, the computer system being coupled to at least the third port having third port identification information;

establishing a first path between the first port and the third port and a second path between the second port and the third port;

receiving, at the switch, a first frame including the first port identification information from the computer system;

sending the first frame from the switch to the storage system via the first path, wherein the storage system receives the first frame via the first port, the first frame being processed within the storage system;

receiving, at the switch, a second frame including the first port identification information from the computer system;

sending the second frame including the fist port identification to the storage system via the second path, wherein the storage system receives the second frame via the second port the second frame being processed within the'storage system.

8. The method of claim 7, further comprising:

selecting the first path for sending a frame from the computer system to the storage system; and selecting the second path for sending a frame from the computer system to the storage system if the first path is determined to be in an unfavorable state.

9. The method of claim 7, wherein the second frame received by the storage system via the second port does not include the second port identification information.

10. A computer readable medium including a computer program for transmitting frames from a computer system to a storage system via a switch provided in a network, the switch having at least first, second and third ports, wherein a logical volume defined in the storage subsystem is mapped to at least the first port having first port identification information and a second port having second port identification information, the computer system being coupled to at least the third port having third port identification information, the computer program comprising:

code for establishing a first path between the first port and the third port and a second path between the second port and the third port;

code for receiving, at the switch, a first frame including the first port identification information from the computer system;

code for sending the first frame from the switch to the storage system via the first path, wherein the storage system receives the first frame via the first port, so that the first frame may be processed within the storage system;

code for receiving, at the switch, a second frame including the first port identification information from the computer system;

code for sending the second frame including the first port identification to the storage system via the second path, wherein the storage system receives the second frame via the second port, so that the second frame may be processed within the storage system.

11. The computer program of claim 4, further comprising:

code for selecting the first path for sending a frame from the computer system to the storage system; and code for selecting the second pat for sending a frame from the computer system to the storage system if the first path is determined to be in an unfavorable state.

* * * * *